(12) United States Patent
Andreas et al.

(10) Patent No.: US 6,493,625 B2
(45) Date of Patent: Dec. 10, 2002

(54) METHOD FOR CONTROLLING THE SPEED AND DISTANCE OF A MOTOR VEHICLE

(75) Inventors: Peter Andreas, Gifhorn; Thomas Ruchatz, Lehre; Wolfgang Baeker, Braunschweig; Thomas Bizenberger, Vechelde; Heiko Rabba, Gifhorn, all of (DE)

(73) Assignee: Volkswagen AG, Wolfsburg/Fallerslebrn (DE)

( * ) Notice: Subject to any disclaimer, the term of this patent is extended or adjusted under 35 U.S.C. 154(b) by 0 days.

(21) Appl. No.: 09/782,088

(22) Filed: Feb. 12, 2001

(65) Prior Publication Data

US 2002/0018003 A1 Feb. 14, 2002

(30) Foreign Application Priority Data

Feb. 12, 2000 (DE) .......................... 100 06 403

(51) Int. Cl.⁷ .............................................. B60K 31/04
(52) U.S. Cl. ........................... 701/96; 701/93; 701/301; 73/178 R; 180/170
(58) Field of Search .............................. 701/96, 93, 91, 701/1, 301; 180/170, 168; 340/903

(56) References Cited

U.S. PATENT DOCUMENTS

| | | | |
|---|---|---|---|
| 5,589,827 A | * | 12/1996 | Scurati ...................... 340/901 |
| 5,978,730 A | * | 11/1999 | Poppen et al. ............... 701/202 |
| 6,202,566 B1 | * | 3/2001 | Hutchinson ................. 105/148 |
| 6,269,298 B1 | * | 7/2001 | Seto ............................. 701/96 |
| 6,298,298 B1 | * | 10/2001 | Tange et al. ................... 701/96 |

FOREIGN PATENT DOCUMENTS

| | | | |
|---|---|---|---|
| DE | 3830790 A1 | * 3/1990 | ............ G05D/1/02 |
| DE | 44 22 982 | 1/1995 | |
| DE | 196 50 168 | 6/1998 | |
| DE | 197 36 964 | 3/1999 | |
| DE | 198 35 518 | 4/1999 | |
| DE | 199 01 175 | 7/1999 | |
| EP | 0 846 587 | 10/1998 | |
| EP | 0 899 148 | 3/1999 | |

\* cited by examiner

*Primary Examiner*—William A. Cuchlinski, Jr.
*Assistant Examiner*—Olga Hernandez
(74) *Attorney, Agent, or Firm*—Kenyon & Kenyon

(57) ABSTRACT

A method for controlling the speed of a motor vehicle and the distance of a motor vehicle to at least one motor vehicle driving ahead includes the steps of: inputting a setpoint trailing distance to the motor vehicle driving ahead; determining, in accordance with at least one detector, at least the speed of the motor vehicle, the distance, and the speed relative to the motor vehicle driving ahead; decelerating or accelerating the motor vehicle in response to the detected distance deviating from the setpoint trailing distance; calculating, in response to the motor vehicle driving ahead being lost from the detection range of the detector (target loss), the speed of the motor vehicle driving ahead from the relative speed determined prior to losing the target; and calculating the actual distance from the driving speed of the motor vehicle. Thus, the speed of the motor vehicle driving ahead is derived from the measured values measured prior to the time of losing the target, and, in accordance with a differential time unit, the distance is extrapolated from the driven speed of the motor vehicle and the speed of the motor vehicle driving ahead.

11 Claims, 1 Drawing Sheet

METHOD FOR CONTROLLING THE SPEED AND DISTANCE OF A MOTOR VEHICLE

FIELD OF THE INVENTION

The present invention relates to a method for controlling the speed of a motor vehicle and the distance of the motor vehicle to at least one motor vehicle driving ahead. A setpoint trailing distance to the motor vehicle driving ahead is input, and at least the speed of the motor vehicle, the distance, and the speed relative to the motor vehicle driving ahead is determined by at least one detector. The motor vehicle is decelerated or accelerated as a function of the relative speed, in response to the detected distance deviating from the setpoint trailing distance. In response to the motor vehicle driving ahead being lost from the detection range of the detector (target loss), the speed of the motor vehicle driving ahead is calculated from the relative speed determined prior to losing the target, from the driving speed of the motor vehicle, and from the actual distance.

BACKGROUND INFORMATION

For example, such a method is described in European Published Patent Application No. 0 846 587. A special problem in controlling distance is that a detected control object, i.e., a motor vehicle driving ahead, is lost from the detection range of the detector, while cornering. This only occurs until the motor vehicle itself has driven sufficiently through the curve, that its detector again detects the motor vehicle driving ahead, and can once more control the distance to the motor vehicle driving ahead. Various scenarios can be tested in a complicated manner in order to adjust the reaction of the motor vehicle to a new situation. Apart from cornering, the possible scenarios include the preceding vehicle detected up to this point performing a passing maneuver or turning off. The handling of the motor vehicle is only adjusted after determining what situation led to the loss of the detected object.

European Published Patent Application No. 0 899 148 describes a method for detecting a control object, in which the handling of the motor vehicle is reliably controlled with respect to the control object, in the case of slow changes, as well as short-term and sudden changes in the motor-vehicle cornering radius. This is accomplished in that, after the control object has left the traffic lane of the motor vehicle, the current position of the motor vehicle is compared to a projection of the control object onto the current position of the motor vehicle, the projection being derived from an actually detected position of the control object. The distance of the motor vehicle is controlled with respect to the control object when the projection and the current position of the motor vehicle approximately correspond to each other. Therefore, the current position of the motor vehicle is compared to information regarding the past position of the control object. That is, an imaginary lag exists for each control object, which the control object pulls behind it. Thus, it is described how the control can operate, when the control object has left the traffic lane of the motor vehicle, e.g., in response to entering a curve. However, the control object is continuously in the detection range of the detector.

German Published Patent Application No. 196 50 168 describes a method for controlling the speed of a motor vehicle, in which, in order to improve the ride comfort of the cruise control, the reason for the object loss may be ascertained in response to the ranging sensor losing the object, and the driving speed is controlled as a function of the reason for losing the object.

German Published Patent Application No. 44 22 982 describes an adaptive cruise control system, in which the vehicle is controlled so that a setpoint trailing distance is maintained from a motor vehicle driving ahead. Then, when the ranging sensor loses sight of the motor vehicle driving ahead while distance is being controlled, the speed of the vehicle driving ahead is estimated, and a setpoint driving speed, which the controlled motor vehicle should maintain, is established in accordance with the estimated speed of the motor vehicle driving ahead.

SUMMARY

It is an object of the present invention to provide a method that controls the speed and distance of a motor vehicle in accordance with at least one motor vehicle driving ahead.

The above and other beneficial objects of the present invention are achieved by providing a method in which the speed ($v_0$) of the motor vehicle driving ahead is derived from the measured values measured prior to the time of losing the target, and, in accordance with a differential time unit ($\Delta t$), a distance ($a_{ex}$) is extrapolated from the driven speed (v) of the motor vehicle and the speed ($v_0$) of the motor vehicle driving ahead. Therefore, to continue controlling the distance after losing the target, it is assumed that the previously detected motor vehicle driving ahead continues to travel at the same speed at which it traveled shortly before the time of losing the target. Based on this assumption, the behavior over time of the distance between the two vehicles may be extrapolated using the traveling speed driven by the controlled vehicle.

In a first approximation, speed ($v_0$) may be assumed to be a constant speed. In addition, speed ($v_0$) may be extrapolated from the speed values (v) and ($v_{rel}$) measured prior to the time of losing the target, as a speed that can change over time. In this case, speed ($v_0$) is only changed over a defined time interval and/or only changed within a predefined speed interval ($\Delta v$), in order to prevent sudden changes in speed, and thus, prevent handling that is too uncomfortable.

Distance ($a_{ex}$) may be extrapolated in an iterative manner, according to the formula $a_{ex}=a_{ex}+\Delta t \cdot (v_0-v)$, where $a_{ex}=a_0$ at time of target loss t=0. Therefore, this is a linear, iterative extrapolation, new value $a_{ex}$ being calculated from the respective, previously determined value of extrapolated distance $a_{ex}$, and from respective relative speed $v_0-v$ multiplied by time interval $\Delta t$. The result of this extrapolation method is both simple and reliable.

In an additional example embodiment, distance $a_{ex}$ is extrapolated until the motor vehicle has reached the location of the preceding motor vehicle, at the time that the preceding motor vehicle was lost from the detection range of the detector. Therefore, the extrapolation is not continued over a period of time that would generate too much inaccuracy in the extrapolated values of distances $a_{ex}$. Thus, the extrapolation is only performed until the controlled motor vehicle has reached the point where the motor vehicle driving ahead was last detected. No information was gathered beforehand for the region behind this location, in the direction of travel, so that continuing the extrapolation would result in a substantial risk to the reliability of the adaptive cruise control.

Furthermore, the method according to the present invention may be performed until a motor vehicle driving ahead is once again detected as a control object by the detector. This frequently occurs before the controlled motor vehicle arrives at the location at which the preceding motor vehicle was last detected by the ranging sensor. The reason for this is that, e.g., during cornering, which often results in the target object being lost, the ranging sensor can detect the preceding vehicle again, using its detection range, when the controlled vehicle has driven far enough into the curve. Since, at the time of losing the target object, the motor vehicle driving ahead has also already driven far into the curve, it will normally have been decelerated to a low driving speed. This results in additional security to using the speed of the preceding motor vehicle immediately prior to the time of losing the target object, as the starting point for the extrapolation. Since this speed is less than that of a motor vehicle accelerating out of the curve, the adaptive cruise control is operated on the safe side during the extrapolation.

After the extrapolation is terminated due to a preceding motor vehicle being detected anew, difference D is determined from new measured distance $a_{neu}$ to the preceding motor vehicle and previously extrapolated distance $a_{ex}$. This difference represents a measure of the extrapolation accuracy, provided that the newly detected motor vehicle is the motor vehicle that was originally detected prior to losing the target. In addition, it may be assumed that the target has changed, and the newly detected motor vehicle may be analyzed as a new control object, if the value of difference D is outside an interval $(D_0, D_1)$. The handling of the preceding motor vehicle detected anew may be monitored in order to subsequently adjust the adaptive cruise control to it.

If no new control object is detected by the ranging sensor after the extrapolation of distance $a_{ex}$ is terminated, the driving situation may then be analyzed to determine which driving situation caused the control object to be lost. Cornering is a previously discussed example of such a driving situation. For example, cornering may be determined with the aid of a yaw-rate sensor or with the aid of sensors connected to the front wheels. If this driving situation is cornering, then the driven speed of the motor vehicle can possibly be maintained further, for a predefined period of time, in order to allow the controlled motor vehicle to drive up to the end of the curve, and then likely re-detect the preceding, previously detected motor vehicle. However, if the driving situation is a lane change on a multi-lane roadway, then this may also be determined by evaluating environmental data. Another driving situation is the detected, preceding motor vehicle turning off the roadway, and thus, permanently driving out of the detection range of the controlled motor vehicle. In the end, the controlled motor vehicle is controlled in a new manner, as a function of the detected driving situation.

DETAILED DESCRIPTION

Figure 1:
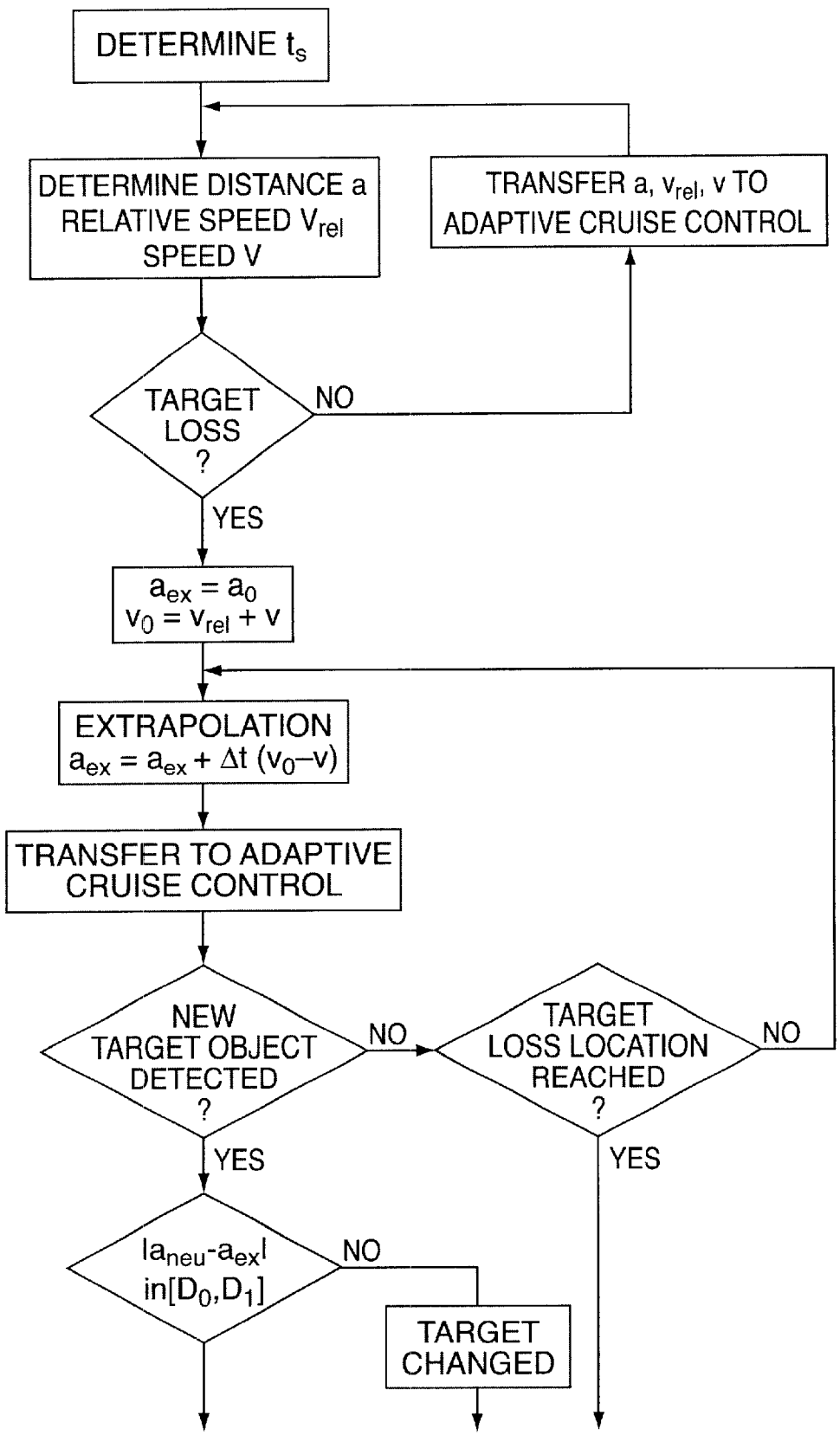
FIG. 1 is a flow chart illustrating the steps of the method according to the present invention.

At the beginning, a trailing time $t_f$ is input, which determines setpoint trailing distance as to a motor vehicle driving ahead. For example, this may be input by a user via an appropriate switch, or trailing time $t_f$ is read from a storage element and input into the control algorithm.

Then, speed v of the motor vehicle, as well as distance a and speed $v_{rel}$ relative to the preceding vehicle, are determined with the aid of a detector. If a motor vehicle driving ahead was able to be detected, then the target was not lost, and the values for distance a, driving speed v, and relative speed $v_{rel}$ are transmitted to the adaptive cruise control. Setpoint trailing distance as is calculated from speed v of the motor vehicle and trailing time $t_f$. In response to detected distance a deviating from setpoint trailing distance $a_s$, the motor vehicle is decelerated or accelerated as a function of relative speed $v_{rel}$. After a time lag necessary for the deceleration or acceleration, a driving situation is attained, in which the controlled motor vehicle follows the preceding motor vehicle at the setpoint trailing distance and essentially travels at a speed equal to that of the motor vehicle driving ahead.

If the vehicle driving ahead is lost from the detection range of the detector, i.e., if a target loss occurs, then, for the subsequent extrapolation, the original value of extrapolated distance $a_{ex}$ is initially set equal to last measured distance $a_0$, and speed $v_0$ of the motor vehicle driving ahead is ascertained by adding the last measured values of relative speed $v_{rel}$ and driving speed v.

During the subsequent extrapolation, extrapolated relative speed $v_0$–v is multiplied by time period $\Delta t$ in predetermined time intervals $\Delta t$, in order to calculate the change in extrapolated distance $a_{ex}$. Speed $v_0$ is either assumed to be constant or is extrapolated as a time-variable speed of the preceding motor vehicle from speed values v and $v_{rel}$ measured prior to losing the target. Subsequently, extrapolated value $a_{ex}$, extrapolated relative speed $v_{rel}$, and measured driving speed v are transmitted to the adaptive cruise control. The further control of distance is performed by the adaptive cruise control, as described above. However, the extrapolated values are used in place of the measured distances and relative speeds.

It is then determined if a new target object, a motor vehicle driving ahead, has been detected by the ranging sensor. If this is not the case, then it is determined if the speed of the controlled motor vehicle and the period of time elapsed since losing the target have caused the controlled motor vehicle to reach the target-loss location of the motor vehicle driving ahead. If this location has not yet been reached, then the previously described extrapolation is continued using the linear function. But if the target-loss location of the motor vehicle driving ahead has been reached, then the driving situation is analyzed anew, and the reason for target loss is determined. The further cruise control and adaptive cruise control of the motor vehicle is performed as a function of the analysis result.

If, however, a new target object is detected by the ranging sensor while the extrapolation is being performed, then difference D of new measured distance $a_{neu}$ to a preceding motor vehicle and last extrapolated distance $a_{ex}$ is determined, whereby a measure for the accuracy of the extrapolation is ascertained. If difference D is outside a selected interval $(D_0, D_1)$, then it is assumed that the target has changed, and the newly detected motor vehicle is analyzed as a new control object. But if the difference is inside interval $(D_0, D_1)$, then it is assumed that the target has not changed, and the newly detected motor vehicle is considered to be the target object, which had been previously detected but was lost for a short time. Then the distance is controlled further using the adaptive cruise control.

What is claimed is:

1. A method for controlling a speed of a first motor vehicle and a distance of the first motor vehicle to at least one second motor vehicle driving ahead, comprising the steps of:

inputting a setpoint trailing distance to the second motor vehicle;

determining at least the speed of the first motor vehicle, the distance between the first motor vehicle and the second motor vehicle and the speed of the first motor vehicle relative to the second motor vehicle in accordance with at least one detector;

decelerating or accelerating the first motor vehicle as a function of the relative speed in response to the determined distance deviating from the setpoint trailing distance;

in response to a target loss of the second motor vehicle from a detection range of the detector, calculating a speed of the second motor vehicle based on the relative speed and the speed of the first motor vehicle determined prior to a time of the target loss and calculating an actual distance; and extrapolating a distance in accordance with a differential unit of time from the speed of the first motor vehicle and the calculated speed of the second motor vehicle.

2. The method according to claim 1, wherein the calculated speed of the second motor vehicle represents a constant speed.

3. The method according to claim 1, wherein speed calculating step includes the substep of extrapolating the speed of the second motor vehicle, as a speed that is changeable over time, based on the speed of the first motor vehicle and the relative speed determined prior to the time of the target loss.

4. The method according to claim 3, wherein the speed extrapolating step is performed only for a predetermined time interval.

5. The method according to claim 3, wherein the speed of the second motor vehicle is changeable only within a predetermined speed interval.

6. The method according to claim 1, wherein the distance extrapolating step includes the substep of iteratively extrapolating the distance according to the formula:

$$a_{ex} = a_{ex} + \Delta t \times (v_0 - v),$$

wherein:

$a_{ex}$ represents the extrapolated distance;

$\Delta t$ represents the differential unit of time;

$V_0$ represents the calculated speed of the second motor vehicle;

v represent the speed of the first motor vehicle; and $a_{ex}$ represents the actual distance at the time of the target loss.

7. The method according to claim 1, where the distance extrapolating step is performed until the first motor vehicle has reached a location of the target loss of the second motor vehicle.

8. The method according to claim 1, wherein the distance extrapolating step is performed until the detector detects a newly detected second motor vehicle as a control object.

9. The method according to claim 8, further comprising the step of determining a difference, after the distance extrapolating step is terminated, between the distance to the newly detected second motor vehicle and a last extrapolated distance.

10. The method according to claim 9, further comprising the step of determining that a target has changed when the value of the difference is outside a predetermined interval and analyzing the newly detected second motor vehicle as a new control object.

11. The method according to claim 7, further comprising the step of determining a driving situation that caused the target loss when no new control object is detected by the sensor after the distance extrapolating step is terminated.

* * * * *